United States Patent
Wright

(10) Patent No.: US 9,415,782 B2
(45) Date of Patent: Aug. 16, 2016

(54) OPTIMAL CONTROL OF AIR COMPRESSORS IN A LOCOMOTIVE CONSIST

(71) Applicant: NEW YORK AIR BRAKE, LLC, Watertown, NY (US)

(72) Inventor: Eric C. Wright, Evans Mills, NY (US)

(73) Assignee: New York Air Brake LLC, Watertown, NY (US)

( * ) Notice: Subject to any disclaimer, the term of this patent is extended or adjusted under 35 U.S.C. 154(b) by 0 days.

(21) Appl. No.: 14/488,355

(22) Filed: Sep. 17, 2014

(65) Prior Publication Data
US 2016/0075346 A1 Mar. 17, 2016

(51) Int. Cl.
*B61C 17/12* (2006.01)
*B61L 15/00* (2006.01)
*G07C 5/08* (2006.01)

(52) U.S. Cl.
CPC .............. *B61C 17/12* (2013.01); *B61L 15/009* (2013.01); *B61L 15/0018* (2013.01); *B61L 15/0063* (2013.01); *B61L 15/0072* (2013.01); *B61L 15/0081* (2013.01); *G07C 5/0808* (2013.01); *B61L 2201/00* (2013.01)

(58) Field of Classification Search
CPC ... B61C 17/12; B61L 2201/00; B61L 15/009; B61L 15/0081; B61L 15/0063; B61L 15/0072; G07C 5/0808
USPC .................. 701/19, 36, 29.1, 29.3, 32.7, 34.4
See application file for complete search history.

(56) References Cited

U.S. PATENT DOCUMENTS

| 2,652,189 | A | 9/1953 | Gorman |
| 6,808,237 | B2 | 10/2004 | Schmid et al. |
| 8,589,003 | B2 * | 11/2013 | Brand ................. B61L 15/0027 701/19 |
| 2005/0205720 | A1 | 9/2005 | Peltz et al. |
| 2012/0143407 | A1 * | 6/2012 | Murthy ................. B60T 13/665 701/19 |
| 2012/0272857 | A1 * | 11/2012 | Graab ..................... B61C 17/00 105/26.05 |
| 2013/0173094 | A1 | 7/2013 | Cooper et al. |
| 2014/0129060 | A1 * | 5/2014 | Cooper ............... B61L 15/0027 701/19 |

OTHER PUBLICATIONS

International Search Report and Written Opinion Form PCT/ISA/220, International Application No. PCT/US2014/055984, p. 1-12, Dated Jun. 18, 2015.

* cited by examiner

*Primary Examiner* — Russell Frejd
(74) *Attorney, Agent, or Firm* — Bond Schoeneck and King PLLC; David Nocilly

(57) ABSTRACT

A system for controlling locomotive compressors in a multiple locomotive consist to optimize compressor life, cold weather operation, and maintenance schedules. Each compressor is associated with a controller than can communicate via an interface to a network with the corresponding controllers of the other compressors that are also interfaced to the network. A lead compressor controller may then issue commands to the other compressor controller to more efficiently restore pressure to the system, to implement improved usage schedules, or to manage maintenance intervals to maximize usage of each compressor during periodic maintenance intervals.

17 Claims, 5 Drawing Sheets

OPTIMAL CONTROL OF AIR COMPRESSORS IN A LOCOMOTIVE CONSIST

BACKGROUND OF THE INVENTION

1. Field of the Invention

The present invention relates to locomotive compressor systems and, more particular, to a system for controlling locomotive compressors in a consist.

2. Description of the Related Art

In heavy haul freight train operations, there are frequently multiple locomotives at the head end of the train, all of which are providing tractive effort to move the train under lead control from the front-most locomotive. The locomotives are typically interconnected into multiple unit (MU) system by four air pipes, consisting of the brake pipe, 20-Pipe, 13-Pipe, and MR Pipe (main reservoir) and a standard "27 Pin" jumper cable. This combination allows the driver in the lead locomotive to drive the trailing locomotives as slaves with MU control of both propulsion and braking.

In an MU configuration, the main reservoirs on each of the locomotives are interconnected via the MR pipe end hose, making the combined MR volume available to the locomotive consist. Each locomotive also includes an air compressor that is used to pressurize the main reservoirs. In addition, the 27 pin train line includes a train line for MU compressor control (usually train line #22). This allows the compressor governor on the lead locomotive to simultaneously start and stop the compressors on all of the locomotives, resulting in very rapid filling of the interconnected MR system. In addition, the MU operation of the compressors assures uninterrupted, adequate air supply even if the compressor on the lead locomotive fails.

While the rapid filling of the MR system is desirable if all the MRs are at a low state of charge, or if the train brake system is discharged, because in these conditions the higher total air capacity of multiple compressors can be fully utilized. However, most of the time, the air system on the locomotives and train brakes are charged, and the air compressor is cycling between the compressor governor upper and lower control limits, typically between 120 psi and 140 psi. As a result, the full capacity of the compressors in the MU is generally not needed.

All of the air flow into the train brake pipe is controlled by the air brake system on the lead locomotive. The locomotive air brake system includes a nominally 19/64" diameter choke restricting the flow between the outlet of MR2 and the inlet of the brake pipe pressure control circuit. Brake pipe pressure is typically fully charged at 90 psi. A full service brake pipe reduction is typically 26 psi, which corresponds to a 64 psi brake pipe pressure. To release the train brakes, the brake pipe is recharged to 90 psi. Because the brake pipe on the train is the length of the train, often in excess of 6000 feet, and due to effect of friction in the pipe, the brake pipe in the front of the train charges well before the brake pipe in the rear of the train. As a result, the brake pipe regulating device (brake pipe relay) in the locomotive brake system begins to throttle the air flow based on the brake pipe pressure at the head of the train before the brake pipe in the train is fully charged. The net combination of the low head pressure at recharge, which is 120 to 140 psi MR pressure flowing into a 64 to 90 psi brake pipe, the 19/64" charging choke, and throttling of the brake pipe relay means that the rate of required air flow is much less than the air flow capacity of the compressor on just one locomotive.

In a MU consist, the combined air flow capacity from the compressors on each of the locomotives is thus much greater than required and, as a result, the compressor duty cycle is very short. For example, in some cases the MR recharge from 120 psi to 140 psi may take less than 30 seconds. This is undesirable for several reasons. First, the compressor start includes high inrush current, high accelerations, and high torque on the components, all of which are ultimately damaging to the compressor. Second, because the compressor runs for so short a time, it is not able to achieve optimum, stable operating temperature. As a result, there is an accelerated wear of cold parts due to transient thermal expansion issues and the cold compressor is more prone to accumulation of condensed water from the product air. Finally, in addition to issues of corrosion, the accumulation of liquid water can freeze in winter operation, thereby causing blockage of the compressor after cooler and discharge lines.

Preferably, the compressor has a longer duty cycle, so that the compressor and related components are heated due to the heat of compression to more or less the same temperature as the discharged air. The normal operating temperature of the compressor results in much less condensation in the compressor system, and enough heat in the after cooler and discharge lines to prevent any liquid water from freezing in those critical locations. Thus, while synchronous control of all the compressors in the locomotive consist might be an advantage during dry charge, or in the event of a failure of the compressor on the lead locomotive, synchronous control is clearly detrimental to compressor life and problematic during cold weather operation because the compressor duty cycle is too short.

In some circumstances a lead locomotive in a consist could be set up to allow for independent compressor control, so the pressure governor on each locomotive turns that compressor on and off independently. This control scheme addresses the issue of too much charge capacity because all the main reservoirs are connected by the MR pipe and therefore the MR pressure on each locomotive is nominally the same and because there is a natural tolerance in the pressure governor settings on each locomotive compressor control. However, in this scheme, one compressor in the locomotive consist will turn on at a higher pressure than the other compressors in the consist due to tolerance variations of the pressure governors and will provide all of the air for the train and, as a result, the compressor utilization and compressor maintenance demand is unbalanced. Typically compressor maintenance is done on a planned, periodic schedule, with certain maintenance actions occurring at regular calendar intervals. Thus, the compressors subject to this control scheme will have done more work during the maintenance interval than others, so some compressors will be maintained too late and some serviced earlier than needed.

BRIEF SUMMARY OF THE INVENTION

The present invention comprises a system for controlling multiple air compressors in a locomotive consist, where the air compressor of each locomotive is associated with a networked controller that can send or receive commands related to the operation of the associated compressor. One predetermined controller is programmed to issue commands to the other controllers so that each compressor is operated more efficiently. For example, each compressor may be sequentially enabled for refilling the MR system each time it needs refilling. The lead controller may also monitor the total utilization of the other compressors since a predetermined point in time or use so that the lead controller can implement a schedule of compressor usage that maximizes utilization of each compressor, thereby ensuring that each compressor is fully utilized during its scheduled maintenance period. The lead controller can also be coupled to thermometers or other sensors to control compressor usage to avoid freezing or other temperature related issues.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
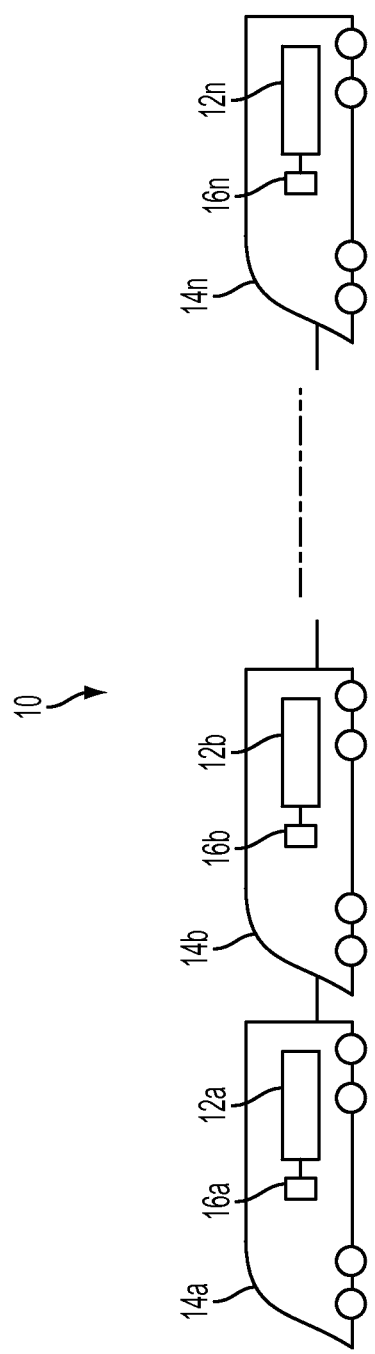
FIG. 1 is a schematic of a multiple unit consist having a compressor control system according to the present invention.
Figure 2:
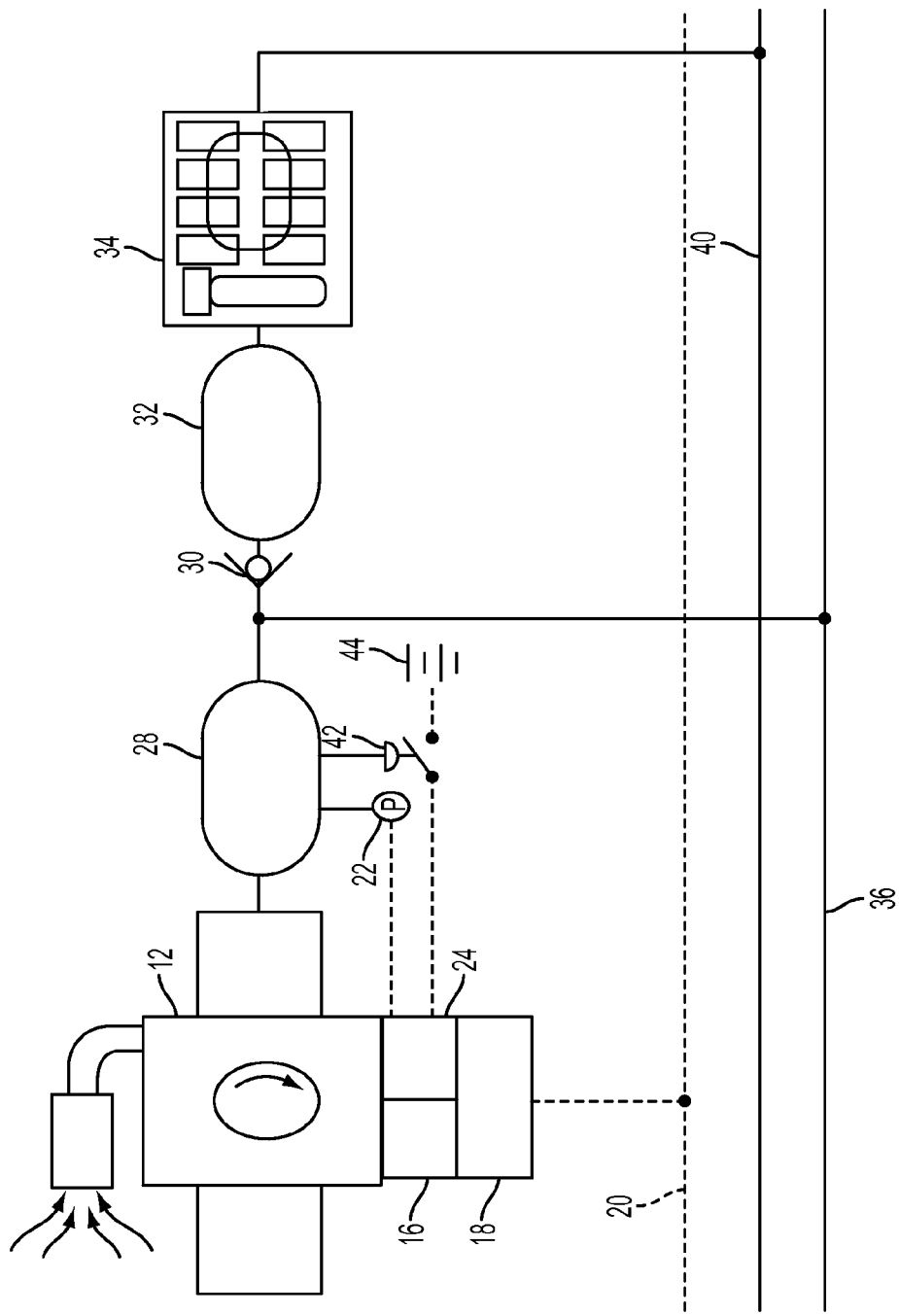
FIG. 2 is a schematic of a compressor control system for each locomotive in a consist according to the present invention.

Referring now to the drawings, wherein like reference numerals refer to like parts throughout, there is seen in FIG. 1, a smart, distributed locomotive compressor control system 10 that optimizes compressor life, cold weather operation, and balances utilization for maintenance optimization. System 10 interconnects the compressor 12 of each locomotive 14 in a multiple unit consist. In a multiple unit consist, one locomotive 14 may be designated as a lead locomotive 14a, while subsequent locomotives 14b through 14n act as slaves. Although FIG. 1 represents lead locomotive 14a at the head of the consist, locomotive 14 designated to act as lead locomotive 14a could be located in any position along the consist As seen in FIG. 2, system 10 is a series of individual locomotive control systems, each of which has an individual controller 16 associated with each compressor 12 of each locomotive 14 in a consist. Controller 16 is networked to other locomotives in the train consist via an interface 18 that connects controller 14 to a network 20 spanning the consist. Network 20 can comprise a wireless network, such as IEEE 802.11 or cellular 3G or 4G network, or a wired network, such as Ethernet or IEEE 802.5, or even a custom network employing a spare wire in the existing 27 pin train lines used for intra-train communications. Preferably, interface 18 includes a power line carrier network signal that is overlaid on the existing 27 pin train line compressor control wire, which is typically wire number 22.

Controller 16 may monitor the rate of pressure increase in the MR system while compressor 12 is operating using a sensor 22 coupled to the MR system, such as a first main reservoir 28. Main reservoir 28 may be connected to the main reservoir pipe 36 of the locomotive. First main reservoir 28 may also be connected via a check valve 30 to a second main reservoir 32. Second main reservoir 32 may be connected to the braking system 34, which is also connected to the brake pipe 40. A power source 44 may be coupled to system 10 via switch 42 that operates in response to pressure in reservoir 28.

System 10 may also be configured so that each controller 16 includes a monitoring module 24 that tracks the total utilization of its corresponding compressor 12 since a predetermined point in time or use, such as the last overhaul or major maintenance. Monitoring module 24 may thus report usage information to lead controller 16, which may then establish and implement a schedule of compressor usage that preferentially commands usage of compressors in the consist that have the lowest accumulated utilization. System 10 may be further optimized by adding a real-time clock to each controller 16 and comparing accumulated compressor utilization with the time remaining until the next scheduled maintenance (or time since last maintenance), so that system 10 can target compressor usage to achieve 100 percent utilization of each compressor 12 by the end of the scheduled maintenance interval. For example, a compressor having 75 percent accumulated utilization that is 95 percent of the way through its maintenance interval would be used preferentially over a compressor having 10 percent utilization that is only 10 percent of the way through its maintenance interval. The addition of a temperature sensor 26 to system 10, will further allow system 10 to manage compressor temperatures and avoid related issues. For example, the compressor control scheme could preferentially operate only one compressor in the consist to optimize the compressor temperature during use of the compressor when the ambient temperature is below freezing.

Figure 3:
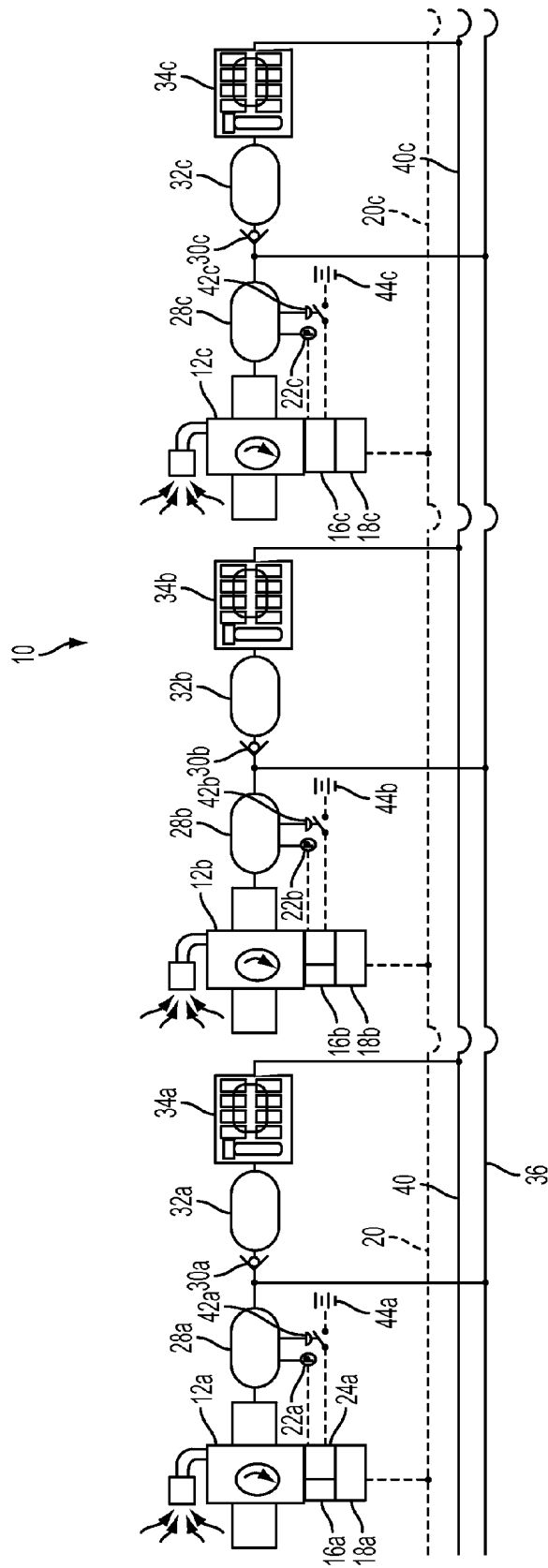
FIG. 3 is a schematic of a networked compressor control system according to the present invention.

As seen in FIG. 3, system 10 includes any number of individual locomotives, each of which includes a compressor control system as seen in FIG. 2. As a result, a designated lead controller 16a of a lead locomotive 14a can asynchronously control each of the compressors on the remaining locomotives 14b through 14n in the consist to optimize charge rate, compressor temperature, and balance compressor utilization. Corresponding elements in the individual system of each locomotive, with three chosen for illustrative purposes, are indicated using sub-numerals (a, b, c).

In order to avoid maintenance interval issues, system 10 may be programmed to manage compressor utilization in several different ways. For example, under control of lead compressor controller 16a, the refilling of the main reservoir system may be done by sequentially enabling each compressor 12b through 12n in the consist. The first time the MR system in the consist needs to be refilled, compressor 12a on the first locomotive is utilized. The next time, compressor 12b on the second locomotive is sent the command to refill the MR system, with system 10 sequentially cycling through each of the remaining compressors 12n. In this way, all of compressors 12a through 12n in the locomotive consist will undergo the same amount of utilization and have an optimized duty cycle.

Figure 4:
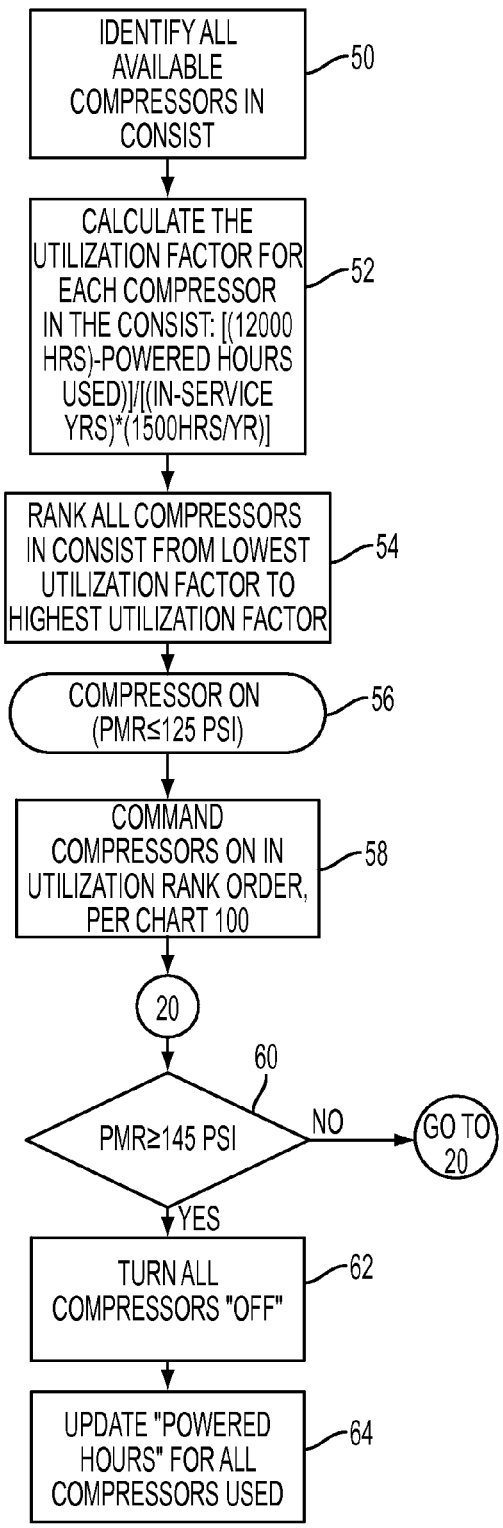
FIG. 4 is a flowchart of compressor control according to the present invention.

As seen in FIG. 4, system 10 may be programmed to preferentially use the compressors having the lowest usage time. The first step involves an identification of all compressors in the consist 50. Next, a utilization factor is calculated for each compressor in the consist 52 based on an assumption of total allowed usage and actual usage. For example, an assumption of an eight year useful life between overhauls and 1500 hours of powered use per year would result in a 12,000 hour useful life. It should be recognized that eight years and 1500 hours are exemplary variables and other values could be used by system 10. Once a utilization factor is calculated for each compressor 52, the compressors may be ranked according utilization 54, such as from lowest to highest utilization. When a compressor ON signal is required 56, such as when the primary main reservoir is equal to or below about 125 psi, a command may be sent to the appropriate compressors 58 using the utilization factor rankings. When a check 60 determines that the primary main reservoir is equal to or above about 145 psi, all compressors may be turned off 62 and the usage hours for each compressor updated accordingly 64.

Figure 5:
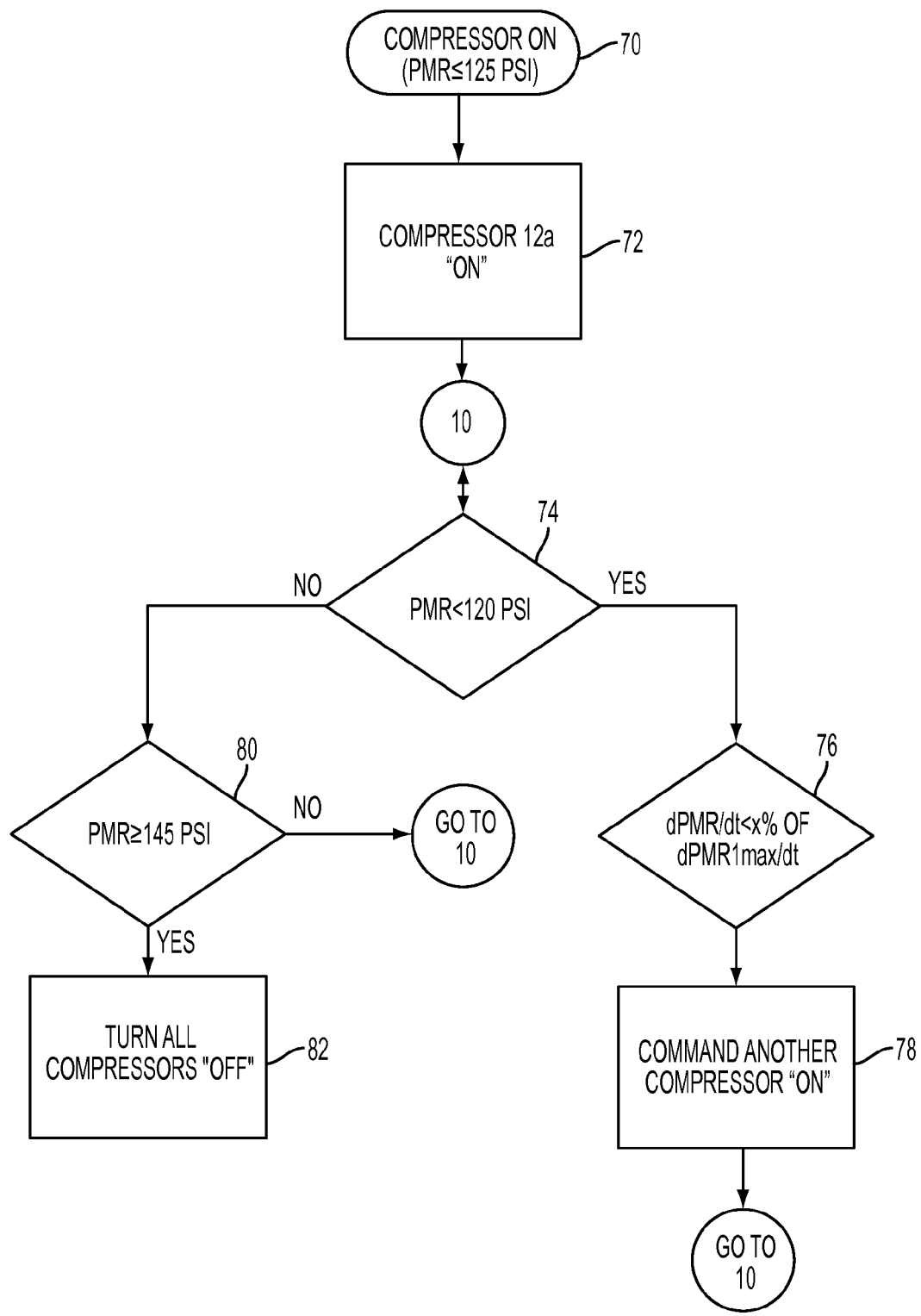
FIG. 5 is a flowchart of compressor system control according to the present invention.

In the event of demand for high air flow, such as during a dry charge of the braking system of train, controller 16a of lead locomotive 14a can monitor the rate of pressure increase in the MR system while compressor 12a is operating using a sensor 22a coupled to the MR system. Sensor 22a can detect the high air flow demand based on the low rate of pressure increase in a reservoir 28a of MR system. In this state, controller 16a of lead compressor 12a can send a command via interface 18a to slave compressors 12b through 12n on network 20 to turn on their corresponding compressors 12b though 12n until the air demand is satisfied. Likewise, using the same methodology, controller 16a of lead compressor 12a can send a command via network 20 that instructs one or more of compressors 12b though 12n to shut off when the rate of MR pressure increase is too fast or desired amount has been achieved. As seen in FIG. 5, the first step such an approach is to determine that the pressure in the primary main reservoir has fallen below a threshold 70, such as 125 psi. The control compressor, such compressor 12a, may then be turned ON 72. A check is made 74 to determine whether the pressure remains below a second, lower threshold, such as 120 psi, which may indicate the need for additional compressors to be turned on due to extremely low pressure. If check 74 determines that the pressure is below the second threshold, a rate of recharging check 76 is made to determine whether rate of increase of pressure is above a predetermined rate. If not, a command is sent 78 to turn on an additional compressor, such as compressor 12n. If check 74 determines that the pressure is not below the second threshold, however, there is no need for additional compressors to be turned on and a check 80 is made to determine whether the primary main reservoir has been adequately re-pressurized. If so, all compressors are turned OFF 82.

What is claimed is:

1. A system for controlling multiple air compressors in a locomotive consist, comprising:
   a first air compressor positioned in a first locomotive;
   a first controller interconnected to the first air compressor and controlling the operation of the first air compressor, wherein the first controller includes a first monitor that tracks a first accumulated total usage of the first air compressor;
   a first interface interconnecting the first controller to a network;
   a second air compressor positioned in a second locomotive
   a second controller interconnected to the second air compressor and controlling the operation of the second air compressor, wherein the second controller includes a second monitor that tracks a second accumulated total usage of the second air compressor;
   a second interface interconnecting the second controller to the network; and
   wherein said first controller is programmed to send a command via the network to the second controller that indicates how the second controller should operate the second compressor based on the first accumulated total usage of the first air compressor and the second accumulated total usage of the second air compressor.

2. The system of claim 1, further comprising a first pressure sensor coupled to a first reservoir of the first locomotive and interconnected to the first controller to provide a signal corresponding to the pressure increase in the first reservoir.

3. The system of claim 2, wherein the first controller is programmed to instruct the second controller how to operate the second compressor based on the pressure increase in the first reservoir.

4. The system of claim 1, wherein the first controller is programmed to compare the second accumulated total usage of the second compressor against a schedule to determine whether to operate the second compressor.

5. The system of claim 4, wherein the first controller is programmed to determine whether to operate one of the first and second compressors based on the relative usage of the first and second compressors.

6. The system of claim 1, wherein the first controller is programmed to sequentially operate the first and second compressors.

7. The system of claim 1, further comprising a first sensor for detecting a first temperature associated with the first compressor, wherein the first controller is programmed to operate just one of the first and second compressors when the first temperature is below freezing.

8. The system of claim 1, wherein said first controller is programmed to establish a schedule governing how to control operation of the first compressor and the second compressor.

9. The system of claim 8, wherein the schedule maximizes the first total accumulated usage of the first compressor and the second accumulated total usage of the second compressor according to a first predetermined maintenance interval for the first compressor and a second predetermined maintenance interval for the second compressor, respectively.

10. A method of controlling air compressors in a locomotive consist, comprising the steps of:
    providing a first controller having operational control over a first compressor;
    providing a second controller having operational control over a second compressor;
    monitoring the accumulated usage of both the first compressor and the second compressor over a predetermined period of time;
    sending a command from the first controller to the second controller that is based on the accumulated usage of the first compressor and the second compressor over the predetermined period of time; and
    operating the second compressor based on the command received from the first controller.

11. The method of claim 10, further comprising the step of detecting the pressure increase in a reservoir being supplied by the first compressor or the second compressor.

12. The method of claim 11, wherein the step of sending a command from the first controller to the second controller comprises sending an instruction to the second controller to operate the second compressor based on the pressure increase in the reservoir.

13. The method of claim 10, wherein the step of sending a command from the first controller to the second controller comprises sending an instruction to operate the second compressor when the usage of the second compressor over a predetermined period of time is less than the usage of the first compressor over a second predetermined period of time.

14. The method of claim 10, wherein the step of sending a command from the first controller to the second controller comprises sending an instruction to operate the second compressor according to a predetermined schedule.

15. The method of claim 10, wherein the step of sending a command from the first controller to the second controller comprises sending an instruction to operate the second compressor when the first compressor is not operating.

16. The method of claim 10, further comprising the step of detecting the ambient temperature.

17. The method of claim 16, wherein only one of the first and second compressors is operated if the ambient temperature is below freezing.

* * * * *